Aug. 8, 1961   G. W. SEULEN ET AL   2,995,641
METHOD OF AND APPARATUS FOR PREPARING AND FEEDING INDUCTIVELY
HEATED SEPARATE WORKPIECES, PARTICULARLY FOR THE
SUBSEQUENT PROCESSING THEREOF IN A HOT
FORMING MACHINE
Filed Sept. 30, 1960                                   2 Sheets-Sheet 1
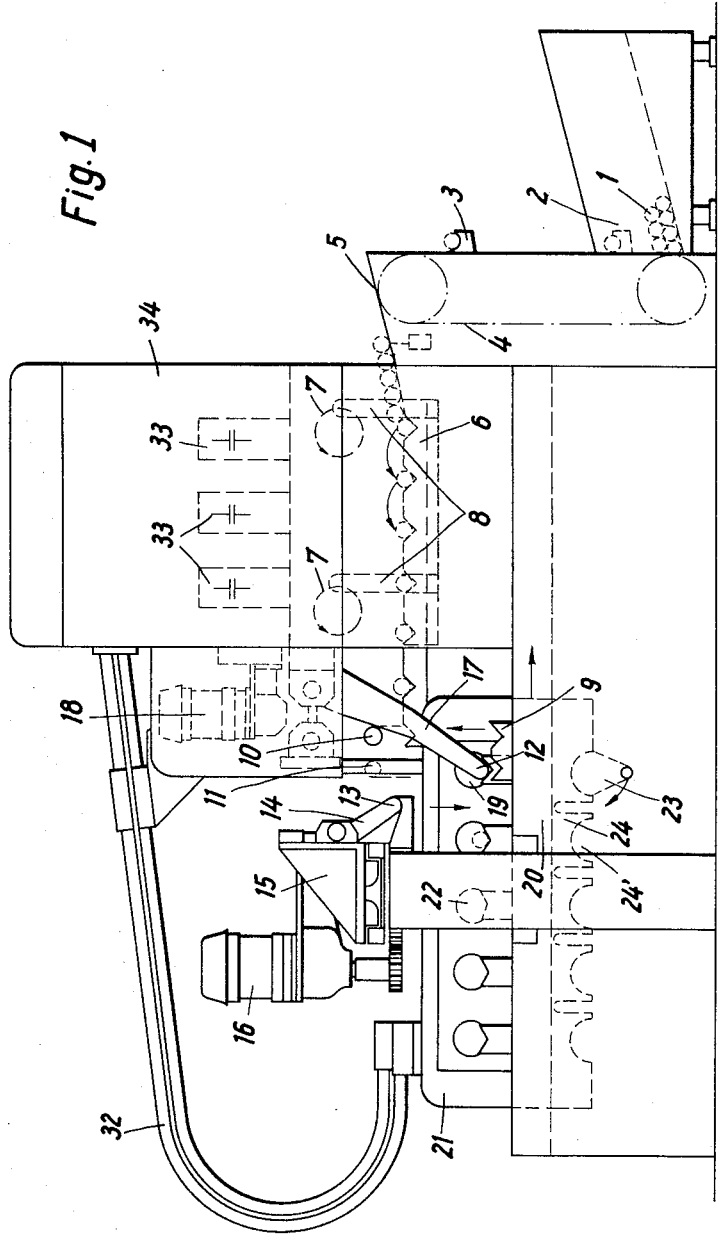
Inventors
Gerhard Seulen
Friedrich Scheffler
Friedrich Karl Gehrmann
By Cushman, Darby & Cushman
Attorneys

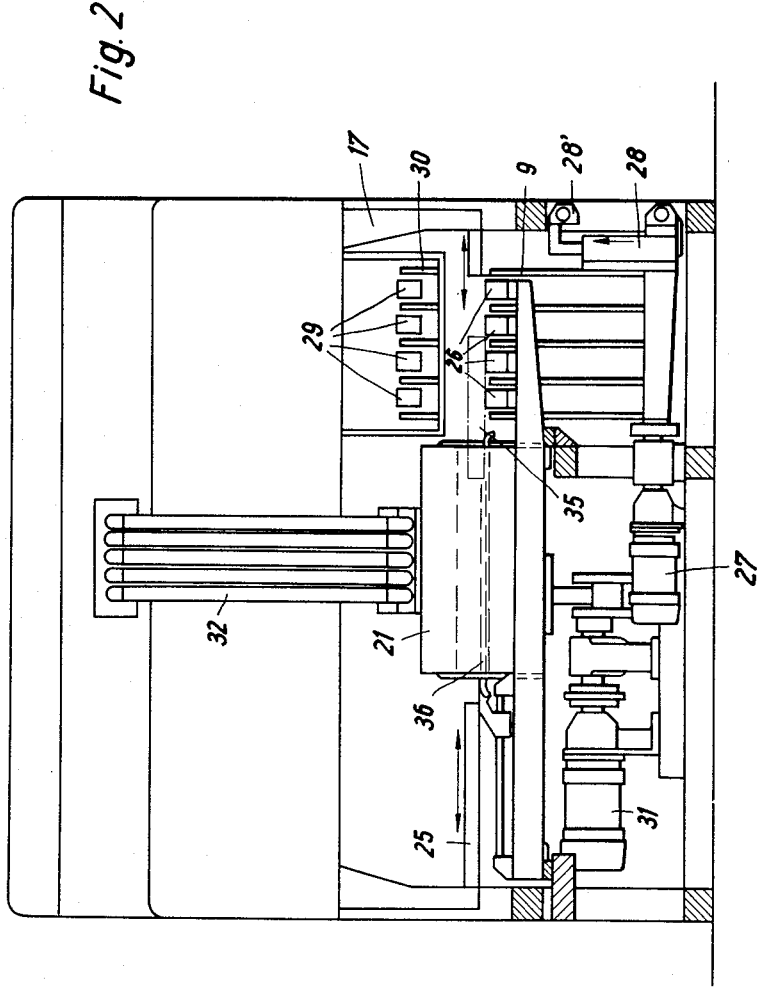

United States Patent Office 2,995,641
Patented Aug. 8, 1961

2,995,641
METHOD OF AND APPARATUS FOR PREPARING AND FEEDING INDUCTIVELY HEATED SEPARATE WORKPIECES, PARTICULARLY FOR THE SUBSEQUENT PROCESSING THEREOF IN A HOT FORMING MACHINE
Gerhard W. Seulen and Friedrich Scheffler, Remscheid, and Friedrich K. Gehrmann, Remscheid-Haddenbach, Germany, assignors to Deutsche Edelstahlwerke Aktiengesellschaft, Krefeld, and Allgemeine Elektricitats-Gesellschaft, Berlin-Grunewald, both in Germany
Filed Sept. 30, 1960, Ser. No. 59,669
Claims priority, application Germany Oct. 8, 1959
8 Claims. (Cl. 219—10.69)

This invention relates to apparatus for preparing inductively heated separate workpieces which are to be either wholly or partly heated to a desired temperature level, particularly for the purpose of feeding the hot workpieces to a subsequent hot forming machine which requires the workpieces to be made available in practically continuous sequence. To this end, it is already known to employ a plurality of inductors assembled in a block which is linearly reciprocatable in a given rhythm in intermittent consecutive steps across an unloading and loading station in such manner that a heated workpiece can be discharged from an inductor each time the block stops.

In this known apparatus the hot workpiece is ejected by the cold workpiece which follows. The objection to this arrangement is that when the plant is shut down a number of workpieces necessarily remain in the inductors unless they are taken out of the same by hand. Moreover, loading and unloading of the workpieces is not a sufficiently precise process, because it requires the cooperation of two rather rough workpieces.

The present invention seeks to overcome these drawbacks of known apparatus. To this end it is proposed to provide injector and ejector means at the loading and unloading station preferably an injector and an ejector on opposite sides of the inductor block. These cooperate with a lift fitted with work supports, e.g., V rests, one for the reception of a heated workpiece and the other for a workpiece to be heated, hereinafter called a cold workpiece. The lift is contrived to move in a rectangular path and when in its raised position it discharges or positions for discharge, by cross traverse, the heated workpiece which had been received on the lift in its lowered position. The heated workpiece may then be delivered to a hot forming machine, such as a press, roll, or the like, e.g., down a chute. In its lowered position, the lift presents the cold workpiece to the loading station, having received the same during its preceding ascent. At the end of a cross traverse in lowered position, the lift receives another heated workpiece.

Loading and unloading of the workpieces is therefore performed at the level of the inductors but to this end the workpieces do not cooperate, as they are positively moved by the injector and ejector means, injection being preferably performed contrary to the direction of ejection. The cold workpieces are received and the hot workpieces delivered to the following hot forming machine in a plane above that of the inductors. Preferably, the cold workpieces are fed to the lift by a lifting bar conveyor and the hot workpieces are discharged by means of a pusher arm operating crosswise of the lift bar conveyor.

The inductor block may comprise a plurality of, say five inductors. The block performs a stepwise reciprocating motion in such manner that every second inductor is stopped at the loading and unloading station. At the reversal points two consecutive inductors are stopped so that after each reversal those inductors are loaded and unloaded which had not stopped at the loading and unloading station during the previous traverse. This form of intermittent reciprocation in a manner known as such—permits the workpieces to remain in the inductors for the necessary length of time for heating them to the required temperature level, though causing the heated workpieces to be delivered to the hot forming machine in a substantially unbroken sequence. Moreover, provision can be made for unloading the inductors when the plant is shut down.

The drawings more or less schematically illustrate a preferred embodiment of the invention. In the drawings—

FIG. 1 is a side elevation and
FIG. 2 a view of the apparatus from the left hand side in FIG. 1.

The apparatus will be described by following the progress of a workpiece through the several assemblies.

The workpieces 1 which may have the form of round or angular and generally rough bar sections are placed in parallel into a feeder box 2. Grippers 3 on a conveyor chain 4 lift the workpieces in succession on to a sloping apron 5. They roll or slide down this apron on to a lifting bar conveyor 6. Member 29 of the lifting bar conveyor is raised and lowered with respect to the stationary member 30 (FIG. 2) by cranks 7 and push rods 8 in a manner that is well understood. The workpieces travel along the lifting bar conveyor until they reach a lift 9.

The transportation of the workpieces from feeder box 2 by conveyor chain 4 and lifting bar conveyor 6 to the lift 9 could, of course, be performed in some other way.

The lift 9 is driven by a motor 27 shown in FIG. 2 up and down guide means 28 in the vertical direction and in the horizontal direction along guide means 28' by a second motor not seen in the drawing. In other words, the lift moves along the sides of a rectangle. The lift carries two V rests, the ascending V rest on the right hand side removing the leading workpiece from the end of the lifting bar conveyor 6 and raising the same into the position shown at 10. The V rest on the left hand side, during the same upward motion, carries up a heated workpiece which is therefore raised into position 11. The lift 9 is then traversed to the left before descending again. In the course of the descent of the lift the cold workpiece reaches the loading and unloading station at point 12, whereas the heated workpiece is intercepted by an angle member at 13. The left hand V rest of the lift therefore returns empty to the lower position of the lift.

A pusher 14 now moves the heated workpiece from point 13 in a direction at right angles to the lifting bar conveyor and pushes it on to a chute, or the like, which delivers the workpiece to the hot forming machine. The pusher 14 is bolted to a slide 15 which is reciprocated by rack and pinion driven by a motor 16. The cold workpiece is simultaneously deposited on a stationary grating 26 (FIG. 2) at the loading and unloading station. An injector 17, likewise actuated by rack and pinion driven by a motor 18, forwards the workpiece axially into the empty inductor coil 19. The injector 17 then returns into its position of rest. If only part of the workpiece 35 is to be heated, it is moved into the position illustratively shown in FIG. 2. An abutment 36 which is adjusted in conformity with the length of the workpiece which is to be heated, prevents the strong magnetic field from drawing the workpiece 35 into the induction coil further than is desired.

The loaded induction coil 19 is one of a set of say five inductors comprised in a block 21 mounted on a slide 20. This block is traversed by a swinging crank 23 cooperating with a flange 24 with recesses 24' which are engaged by the crank. Crank 23 is driven by a motor 31 which is shown in FIG. 2. In the working phase shown in the drawings the inductor block is in course of being moved to the right in such a way that each second inductor is stopped at the loading and unloading station. After reversal of the direction of traverse, that is to say when block 21 has reached the end of its traverse in one direction and begins to return, the inductors which had previously not been stopped at 12 are now stopped during the return traverse because the last inductor prior to reversal and the first inductor after reversal are both stopped at the loading and unloading station, the stopping sequence therefore being 1, 3, 5, 4, 2, 1. Stopping is effected by limit switches actuated by cam means.

In the course of traverse to the right inductor 22 is therefore the first to be stopped at 12. The ejector 25 (FIG. 2) pushes the heated workpiece out of inductor 22 on to a grating 26 and then returns into its position of rest. This ejector 25 which therefore works on the side opposite injector 17 is driven by an electric motor in the same way as the latter. This motor is not shown in the drawing. In its left hand V rest the ascending lift 9 raises the heated workpiece from grating 26 and the described sequence of events is repeated.

The inductors comprised in the block 21 are fed through flexible cables 32 which are attached to the reciprocatable block. They extend from a casing 34 which contains the condensers 33 for compensating the reactive load on the medium frequency side.

The stepwise reciprocation of block 21, the motions of the injectors and ejectors 17 and 25, as well as the motions of lift 9 and pusher 14 must be exactly synchronised. This is done in conventional manner by relays. The same applies to the operation of the lifting bar conveyor and of the conveyor chain which feeds it.

What we claims is:

1. Apparatus for feeding and inductively heating and discharging separate workpieces substantially in unbroken sequence, comprising a plurality of inductors, a loading and unloading station, means for bringing the inductors in predetermined sequence to the said station, means for ejecting a heated workpiece from and for injecting another workpiece into heating relation with a said inductor at the said station, and a lift co-operating with said means and comprising a work rest for a heated workpiece ejected from and a work rest for a workpiece to be presented to an inductor at the said station, and means for motivating said lift in a susbtantially rectangular path so that during each cycle of rise and descent and lateral movement first in one direction and then the other a heated workpiece is collected from an inductor, raised and discharged and a workpiece still to be heated is collected, lowered and fed to the inductor.

2. Apparatus for feeding and inductively heating and discharging separate workpieces substantially in unbroken sequence, comprising a plurality of inductors and a carrier therefor, a loading and unloading station, means for linearly reciprocating said carrier stepwise across the said station, ejector and injector means located on opposite sides of said carrier, a lift co-operating with said means and comprising two work rests one for a heated workpiece ejected from and one for a workpiece to be injected into heating relation with an inductor by said means, and means for motivating said lift in a substantially rectangular path so that the lift is operative to raise a heated workpiece and entrain a workpiece still to be heated and then be subjected to a movement of traverse to move the heated workpiece to discharging position followed by a movement of descent to lower the workpiece still to be heated to the loading station and receive another movement of traverse in the opposite direction for the lift of another heated workpiece.

3. Apparatus according to claim 1 comprising a lift bar conveyor co-operating with the said lift in the vicinity of its upper position for feeding workpieces to be heated to the lift and means for discharging hot workpieces by movement crosswise of the conveyor, e.g., to hot forming machine.

4. Apparatus according to claim 1, in which said inductors are carried as an assembly and comprising a crank means for traversing the asembly in stepwise reciprocating movement relatively to the loading and unloading station.

5. Apparatus according to claim 2, in which the inductors are carried as an assembly of an odd number of inductors and in each direction of traverse each second inductor is brought to operative position in relation with the loading and unloading station at each stepwise displacement until the first inductor is again at the said station.

6. Apparatus according to claim 3 in which said means comprise a pusher, said pusher being secured to a slide, and rack and pinion means for reciprocating said slide.

7. Apparatus according to claim 3, comprising a sloping apron for supplying the said lifting bar conveyor with workpieces and a paternoster hoist serving said apron.

8. A method of feeding inductively heating and discharging separate workpieces substantially in unbroken sequence which comprises advancing a plurality of inductive heating elements to bring them in predetermined sequence to a workpiece loading and unloading station, ejecting an already heated workpiece from heating relation to one of said elements onto one of a pair of work rests, raising the pair of work rests together so that the empty one collects a workpiece which is yet to be heated, displacing the two work rests laterally when they have ascended and then discharging the said heated workpiece off its rest, lowering the two work-rests from the said laterally displaced position to bring them again to the loading and unloading station, and injecting the workpiece still to be heated off its rest into heat cooperation with the said element, displacing the said work rests laterally in the reverse direction and stepwise advancing the said elements and ejecting another heated workpiece from another of the said elements onto the work rest which carried the previously heated workpiece and again raising the work rests for repeat operation.

References Cited in the file of this patent

UNITED STATES PATENTS 2,942,089     Baker et al.             June 21, 1960